(12) United States Patent
McGhee

(10) Patent No.: US 11,845,308 B2
(45) Date of Patent: Dec. 19, 2023

(54) TIRE EMERGENCY SAFETY VALVE

(71) Applicant: James Andrew McGhee, Brookfield (AU)

(72) Inventor: James Andrew McGhee, Brookfield (AU)

( * ) Notice: Subject to any disclaimer, the term of this patent is extended or adjusted under 35 U.S.C. 154(b) by 0 days.

(21) Appl. No.: 17/636,815

(22) PCT Filed: Sep. 2, 2020

(86) PCT No.: PCT/AU2020/000100
§ 371 (c)(1),
(2) Date: Feb. 18, 2022

(87) PCT Pub. No.: WO2021/042154
PCT Pub. Date: Mar. 11, 2021

(65) Prior Publication Data
US 2022/0288981 A1 Sep. 15, 2022

(30) Foreign Application Priority Data
Sep. 3, 2019 (AU) .................................. 2019903237

(51) Int. Cl.
*B60C 29/06* (2006.01)
*B60C 23/00* (2006.01)
(Continued)

(52) U.S. Cl.
CPC .......... *B60C 29/068* (2013.01); *B60C 23/002* (2013.01); *B60C 23/00354* (2020.05);
(Continued)

(58) Field of Classification Search
CPC ............. Y10T 137/36; Y10T 137/3677; Y10T 137/877; Y10T 137/87861; B60C 29/068
See application file for complete search history.

(56) References Cited

U.S. PATENT DOCUMENTS 1,144,499 A * 6/1915 Owens et al. .......... B60S 5/043
137/224
1,183,071 A * 5/1916 Kaiser .................... B60S 5/043
137/542

(Continued)

FOREIGN PATENT DOCUMENTS

EP 3227129 B1 10/2018
WO 2009010054 A2 1/2009

*Primary Examiner* — Robert K Arundale
(74) *Attorney, Agent, or Firm* — Craft Chu PLLC; Andrew W. Chu

(57) ABSTRACT

A safety valve replaces a tire valve. The valve includes a generally elongate hollow main body having an upper portion, a lower flex hose connector, a side tubular branch having a valve seat with a ball valve, an electronics housing having a battery, motor and a drive pin for the ball valve. The lower flex hose connector is adapted for connection to a flex hose or valve stem of the vehicle tire. The side branch branches from the main body and communicates with the hollow interior of the main body. The side branch has a plurality of air exit apertures at its periphery. The valve seat includes a base with an aperture therein through which the drive pin can extend through to engage the ball valve. The ball valve sits in the base and is biased in the valve seat via a spring to cover the aperture.

14 Claims, 7 Drawing Sheets

(51) Int. Cl.
*F16K 15/18* (2006.01)
*B60C 23/04* (2006.01)
*F16K 15/20* (2006.01)

(52) U.S. Cl.
CPC ...... *B60C 23/0496* (2013.01); *F16K 15/1823* (2021.08); *F16K 15/207* (2013.01); *Y10T 137/36* (2015.04)

(56) References Cited

U.S. PATENT DOCUMENTS

| | | | | |
|---|---|---|---|---|
| 1,375,429 A * | 4/1921 | Van Camp | ......... | B60C 23/0496 137/224 |
| 1,487,851 A * | 3/1924 | Hammond | ......... | B60C 23/0496 137/228 |
| 2,359,162 A * | 9/1944 | Sherbondy | ............. | B60S 5/043 141/84 |
| 3,312,213 A * | 4/1967 | Timm | ................ | A61F 5/05816 602/13 |
| 3,807,432 A * | 4/1974 | Cain | .................... | F16K 15/207 137/224 |
| 3,830,249 A * | 8/1974 | Fleenor | .................. | B60C 29/06 137/227 |
| 3,910,305 A * | 10/1975 | Hughes | ............... | F16K 17/042 137/530 |
| 4,015,623 A * | 4/1977 | Wanstreet | .............. | F16K 15/20 137/232 |
| 4,015,624 A * | 4/1977 | Wanstreet | .............. | F16K 15/20 137/232 |
| 4,869,306 A * | 9/1989 | Keys | ...................... | B60C 29/06 152/428 |
| 5,054,511 A * | 10/1991 | Tuan | ................... | B60C 23/0496 137/224 |
| 5,544,670 A * | 8/1996 | Phillips | .................... | B60S 5/04 137/224 |
| 5,544,688 A * | 8/1996 | Freigang | ........... | B60C 23/00363 251/83 |
| 6,144,295 A * | 11/2000 | Adams | ............. | B60C 23/00354 137/224 |
| 6,293,297 B1 * | 9/2001 | Maldonado | ......... | B60C 23/0496 137/227 |
| 6,296,010 B1 * | 10/2001 | DeLauer | ............... | F16K 15/207 137/232 |
| 6,453,737 B2 * | 9/2002 | Young | ................ | B60C 23/0416 340/447 |
| 8,146,413 B1 * | 4/2012 | Grace | ................ | B60C 23/0496 73/146.8 |
| 11,535,069 B2 * | 12/2022 | Jordan | ................ | B60C 23/0408 |
| 2004/0020534 A1 * | 2/2004 | Beau | ................ | B60C 23/00372 152/416 |
| 2009/0293960 A1 * | 12/2009 | Tzarum | ................ | B60R 25/096 137/68.13 |
| 2011/0017317 A1 * | 1/2011 | Pritschet | .......... | B60C 23/00354 137/223 |
| 2012/0305101 A1 * | 12/2012 | Merrill | ................ | B60C 29/064 137/223 |
| 2016/0325593 A1 * | 11/2016 | Austin | .................. | B60C 29/068 |
| 2017/0361667 A1 * | 12/2017 | Foor | .................... | F16K 15/026 |

* cited by examiner

TIRE EMERGENCY SAFETY VALVE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a safety valve for tires for emergency situations.

2. Description of Related Art Including Information Disclosed Under 37 CFR 1.97 and 37 CFR 1.98

Tires on mining trucks, cranes and other heavy vehicles can catch fire under different circumstances, with the potential for the tires to then explode. A lesser-known danger arises when the combustion takes place inside the tire, with no external signs. Whenever excess heat is developed in or applied to a tire, it can initiate a process within the tire known as pyrolysis—the decomposition of a substance by heat. This can cause a build-up of flammable gases and pressure within the tire, which may ultimately rupture or explode. Any fire in the tire or vehicle causes risk to personnel and other assets and requires minimization and hazard management. Most hot tires are from separation which is hot on the outside tread area.

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

BRIEF SUMMARY OF THE INVENTION

According to a first aspect, the present invention provides a safety valve for connection to a tire valve or valve stem of a vehicle tire, the safety valve comprising: a hollow body having a lower end for attachment to the tire valve or valve stem, the body comprising a main internal passage, a side branch extending from the body, the side branch defining a second passage having a movable blocking component, and an actuation means for moving the blocking component to deflate the tire via the second passage.

Preferably, the lower end is adapted for attachment to a flex hose connector of the tire.

Preferably, the body comprises an upper portion having an internal thread and an external thread, wherein an inflator hose can be attached via the external thread and a sealing cap can be mounted via the internal thread 122.

Preferably, the side branch comprises a block shaped portion a plurality of air exit apertures at its periphery.

Preferably, the blocking component comprises a ball valve mounted in a valve seat, the valve seat comprising a base having an aperture through which the actuation means can extend through to engage the ball valve.

Preferably, the ball valve is biased in the valve seat via a spring to cover the aperture.

Preferably, the actuation means comprises a drive pin that can extend through the base aperture to engage the ball valve, to move the ball valve away from the valve seat aperture and allow air to escape via the air exit apertures.

Preferably, the drive pin is movable via an electric motor, solenoid, linear actuator, or other suitable electronic actuator means Preferably, the safety valve further comprises an electronics housing connected to the body and housing a battery for the electronic actuator means, and wireless communication means for the actuator Preferably, the actuator is an electric motor and is coupled to the drive pin, the housing having a threaded aperture at its sidewall, and where the drive pin comprises a threaded base and an extended pin, wherein the threaded base is threadably received by the housing threaded aperture such that rotation of the motor moves the drive pin in or out for engaging with or disengaging from the ball valve.

Preferably, the wireless communication means is adapted for receiving an actuation signal to move the blocking component to deflate the tire via the second passage of side branch.

Preferably, the second passage has a larger diameter than the main passage.

Preferably, the safety valve further comprises a heat sensor, at which the actuation means will automatically actuate if the heat adjacent the valve exceeds a predetermined temperature.

Preferably, the safety valve further comprises a pressure sensor, at which the actuation means will automatically actuate if the pressure measured by the valve exceeds a predetermined pressure.

Preferably, the housing includes mounting means to the vehicle rim

The invention also provides an assembly comprising a plurality of safety valves according to claim 11 and a control module for remotely monitoring the status of each safety valve and remotely actuating one or more of the safety valves as desired.

The invention also provides a vehicle having the assembly of the above, the safety valves mounted to each respective tire thereof.

The invention in another aspect provides a safety valve for a tire valve, the safety valve comprising: a body having a lower end for attachment to the tire valve, an engagement means within the body positioned for engaging a valve core of the tire valve, an actuator actuatable for moving the engagement means, and a control and wireless communication means for receiving a signal to actuate the actuator such that the engagement means engages the valve core to deflate the tire when required.

Preferably, the body comprises a lower tubular portion having the engagement means and an upper housing.

Preferably, the engagement means is a pushrod.

Preferably, the actuator is powered by a battery which can be a disposable battery or a rechargeable battery.

Preferably, the actuator is an electric motor with a gearbox or a linear actuator.

Preferably, the wireless communication means comprises a Bluetooth module.

Preferably, the safety valve includes a control device for communicating with a plurality of safety valves.

The invention also provides a vehicle having the safety valves of the above.

The invention also provides a safety valve for a tire valve, the safety valve comprising: a body having a lower end for attachment to the tire valve, the body comprising a main passage, a valve core for blocking the main passage, the valve core being movable for unblocking the main passage for inflating or deflating the tire, a side branch extending from the body, the side branch defining a second passage having a blocking component, and a control and wireless communication means for receiving an actuation signal to move the blocking component to deflate the tire via the second passage of side branch.

Preferably, the side branch is disposed upstream of the valve core.

Preferably, the second passage has a larger diameter than the main passage.

Preferably, the blocking component is completely removed from the second passage when actuated.

Preferably, the side branch comprises a closing cap which is removed when the actuation signal is received.

Other aspects of the invention are also disclosed.

BRIEF DESCRIPTION OF THE SEVERAL VIEWS OF THE DRAWINGS

Notwithstanding any other forms which may fall within the scope of the present invention, preferred embodiments of the present invention will now be described, by way of examples only, with reference to the accompanying drawings.

DETAILED DESCRIPTION OF THE INVENTION

Figure 1:
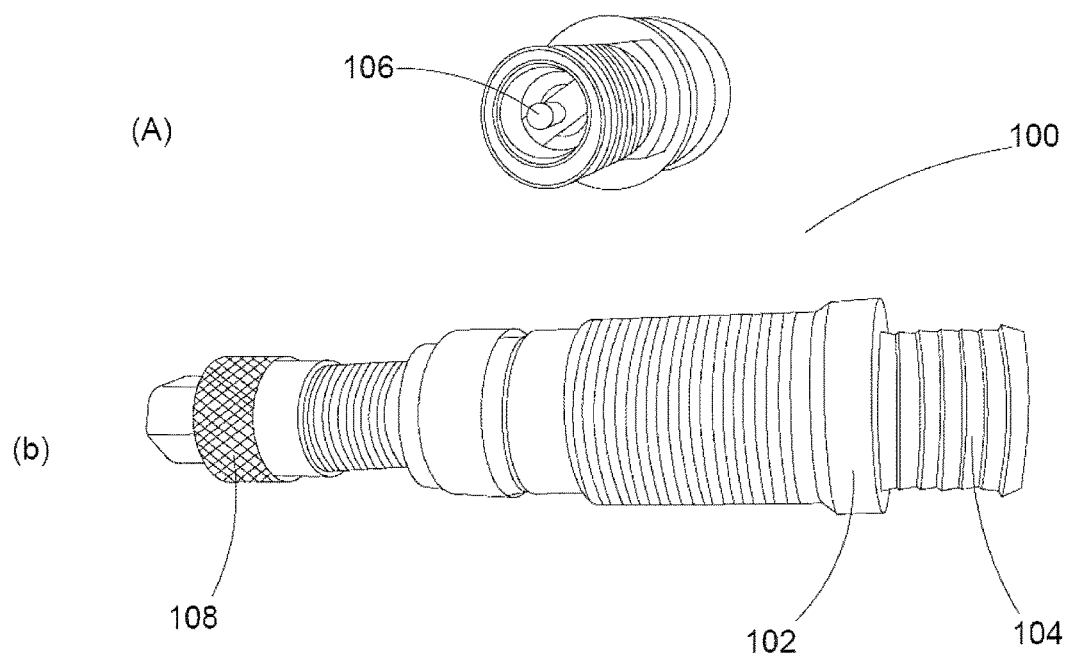
FIG. 1 shows (a) top perspective view of a tire valve for a 350 ton truck, and (b) side view of the valve with a valve cap.

It should be noted in the following description that like or the same reference numerals in different embodiments denote the same or similar features.

FIG. 1 shows a tire valve 100 for a 100 ton mining truck or larger or production loader tires. Tire valve 100 as is known comprises an elongate hollow body 102, a flex hose attachment formation 104 at one end, and a valve core 106 within the body 102. The valve core 106 is depressed inwardly to open the valve for inflating or deflating the tire. The tire valve 100 includes a valve cap 108 to cover the valve core 106 from dirt and accidental actuation.

The present invention relates to a safety valve 10 for a tire valve 100 to provide for quick deflation (let the air out) of the tire in emergency situations, with remote activation of the deflation actuator of the safety valve 10.

Figure 2:
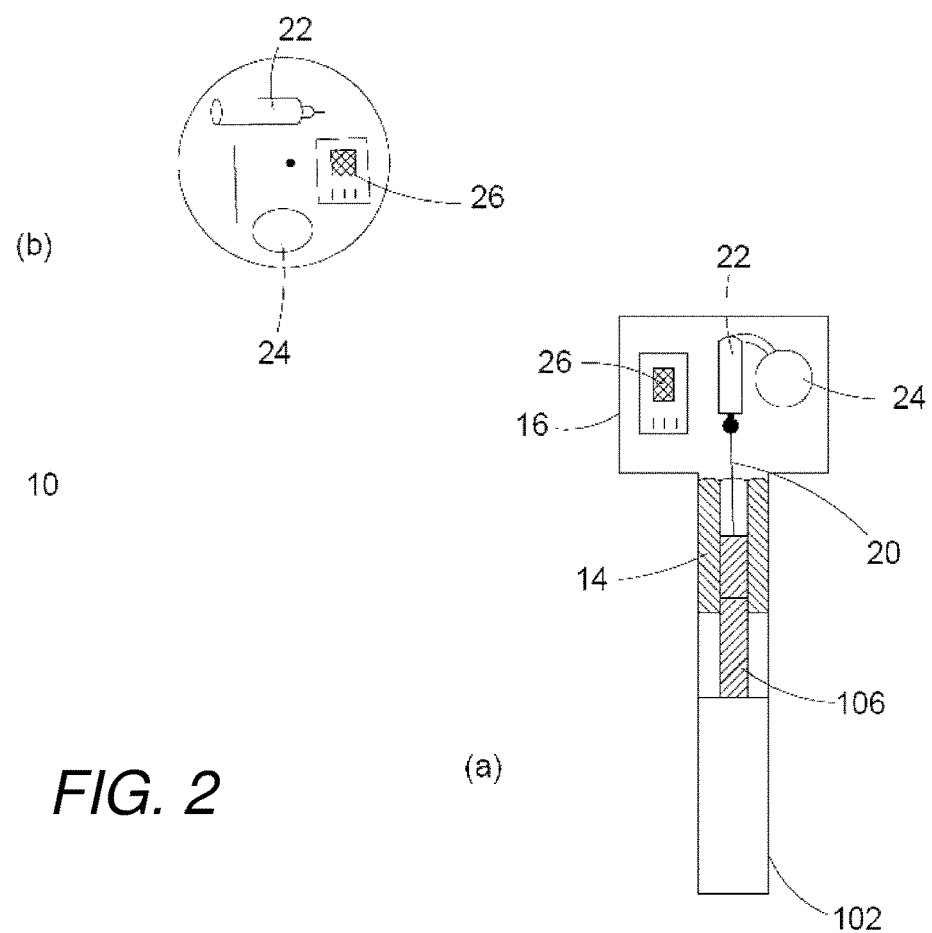
FIG. 2 schematically shows (a) top plan view, and (b) side cross-section view of a safety valve according to the present invention mounted to a tire valve.

Referring to FIG. 2, the safety valve 10 is designed to replace the valve cap 108 and comprises a generally elongate body having a lower tube 14 and an upper housing 16. The lower tube 14 has an internally threaded lower end for threaded attachment to the tire valve body 102. Extending downwardly from the upper housing 16 and into the lower tube 14 is an engagement means for the valve core 106, being a pushrod 20. When the safety valve 10 is mounted to the tire valve 100, the pushrod 20 is disposed in position at which it is ready depress the valve core 106 upon actuation movement thereof.

The upper housing 16 comprises an actuator 22 for moving the engagement means (pushrod 20). The actuator 22 in this embodiment comprises an electric motor coupled to a gearbox or a linear actuator, or solenoid which is actuatable to move the pushrod 20 down to engage the valve core 106.

The actuator 22 is powered by a battery 24 which can be a disposable button battery or a rechargeable battery. The safety valve 10 further includes control and wireless communication means 26 which in the example comprises an electronic printed circuit board with a Bluetooth™ module or other suitable wireless module.

In use, a plurality of the safety valves 10 are used to replace the respective valve caps 108 in a large vehicle such as a mining truck. All of the safety valves 10 are connected to a control device via the wireless communication means. In the event of an emergency, the user is able to send an instruction via the control device for all of the safety valves 10 to engage the respective valve cores 106 to immediately release the air from the respective tires. This reduces the chances of such tires blowing up and causing injury.

In one embodiment, actuation of the safety valves 10 is automated via predetermined actuation events, such as triggering of a fire detector or a general vehicle alarm.

The invention thus provides a safety valve which will replace the valve cap with tire valve unit as a whole staying the same. The only change is the end cap which will be the remote actuatable wireless tire deflater.

Other modifications are possible for the safety valve 10 are possible.

Figure 3:
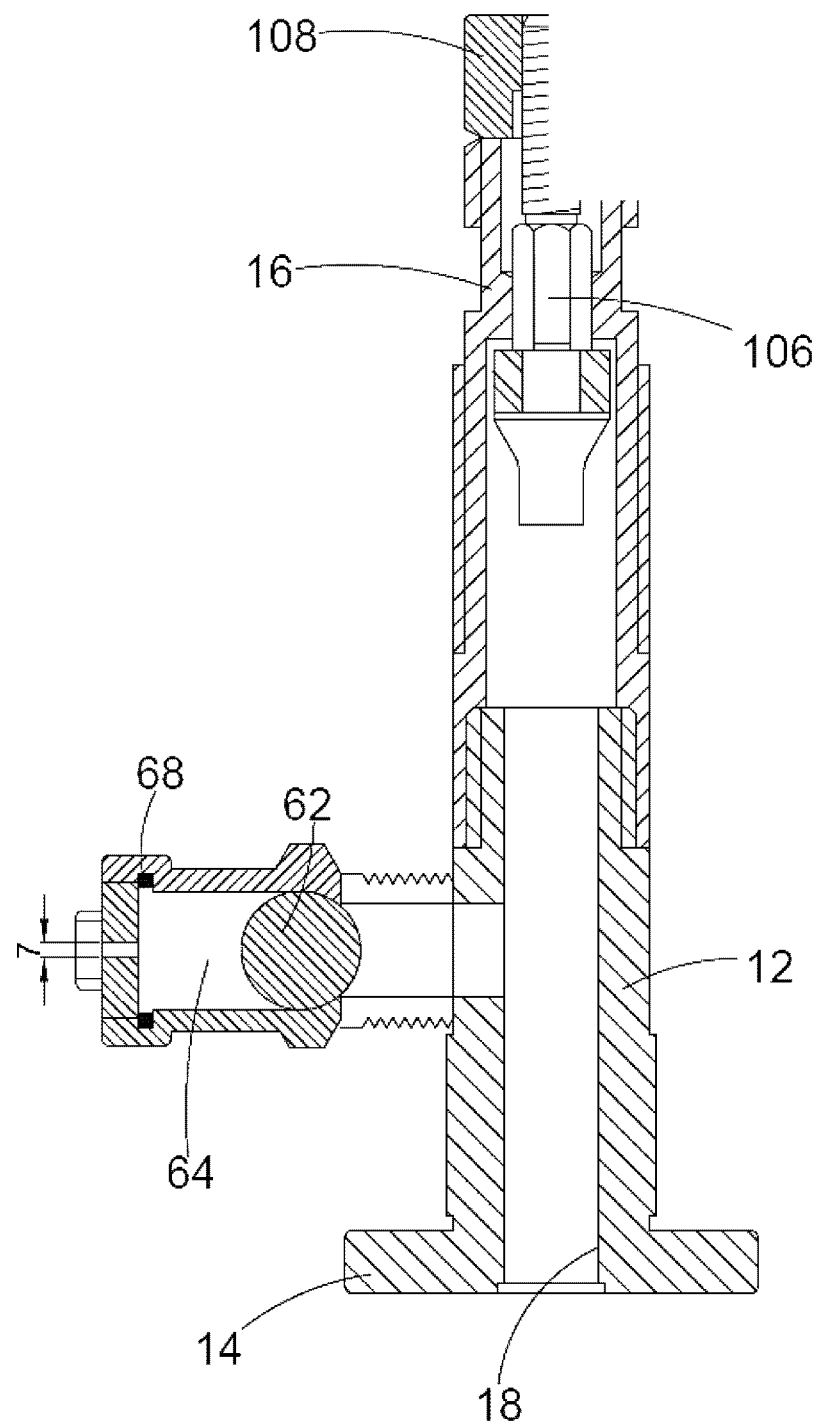
FIG. 3 is a schematic side view of another embodiment of the safety valve.

FIG. 3 shows another embodiment of a safety valve 10*b* which replaces a tire valve. This embodiment also shows a generally elongate body 12 having a lower tube 14 and an upper tube 16. The lower tube 14 has a lower end 18 which will screw thread/mount on a port (hole in wheel rim) where the tire valve screws into or onto a flex hose. The upper tube 16 includes a conventional valve core 106 and valve cap 108.

The lower tube 18 includes a side tubular branch 60 branching therefrom and communicating with the interior of the body 12 upstream from the valve core 106. The side branch 60 includes a blocking component 62 which blocks an internal passage 64 thereof and prevents air from escaping the valve 10b. The blocking component 62 can be an internal plate, ball or other suitable shape for blocking the internal passage 64.

The blocking component 62 can include a lug extending to the outside of the side branch 60 with a pin connected to a solenoid, and when activated opens the blocking component to release the air from the tire.

Another option can be a cap 68 that can be unscrewed quickly also for rapid air release. The blocking component 62 for example can be adapted to disintegrate rapidly when actuated which will also blow the cap 68 off the side branch 60.

The safety valves can be activated from an immediate area next to the vehicle up to a distance of 2,400 meters. The valve bank will be remotely activated either by the VIMS in the mining truck which is the (vital information system) or the ECU (Engine control unit) or WIFI within the truck. The safety valves can also be activated by a long distance system called Laura. Either of those control activated systems can either be set off by a panel inside the truck by the operator under strict instruction, set off by mine control dispatch. Alternatively mining bosses and emergency response via iPad linked to any one of those systems. Another form of comms could be through Tire/or rim manufacturing monitoring systems already linked to the truck.

The safety valves 10 are connected to a control device such as a smartphone or tablet (e.g. iPad™). If used, each safety valve with return a signal to indicate that activation has occurred so the user knows the air is being fully released from the tire. The invention thus provides a safety device in the active mining area and can also be used by tire fitters in the workshop.

Figure 4:
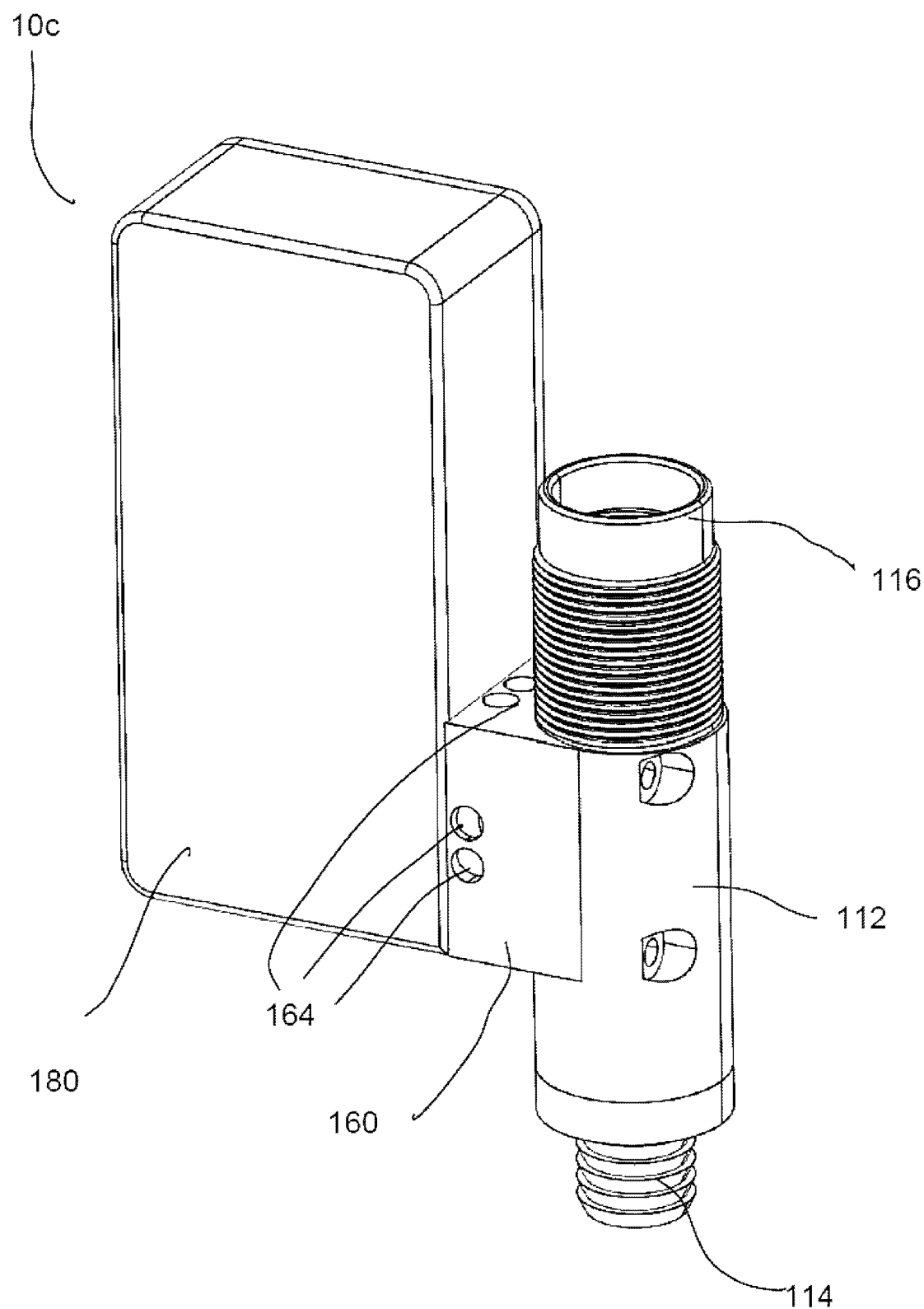
FIG. 4 is a side perspective view of another embodiment of the safety valve.
Figure 5:
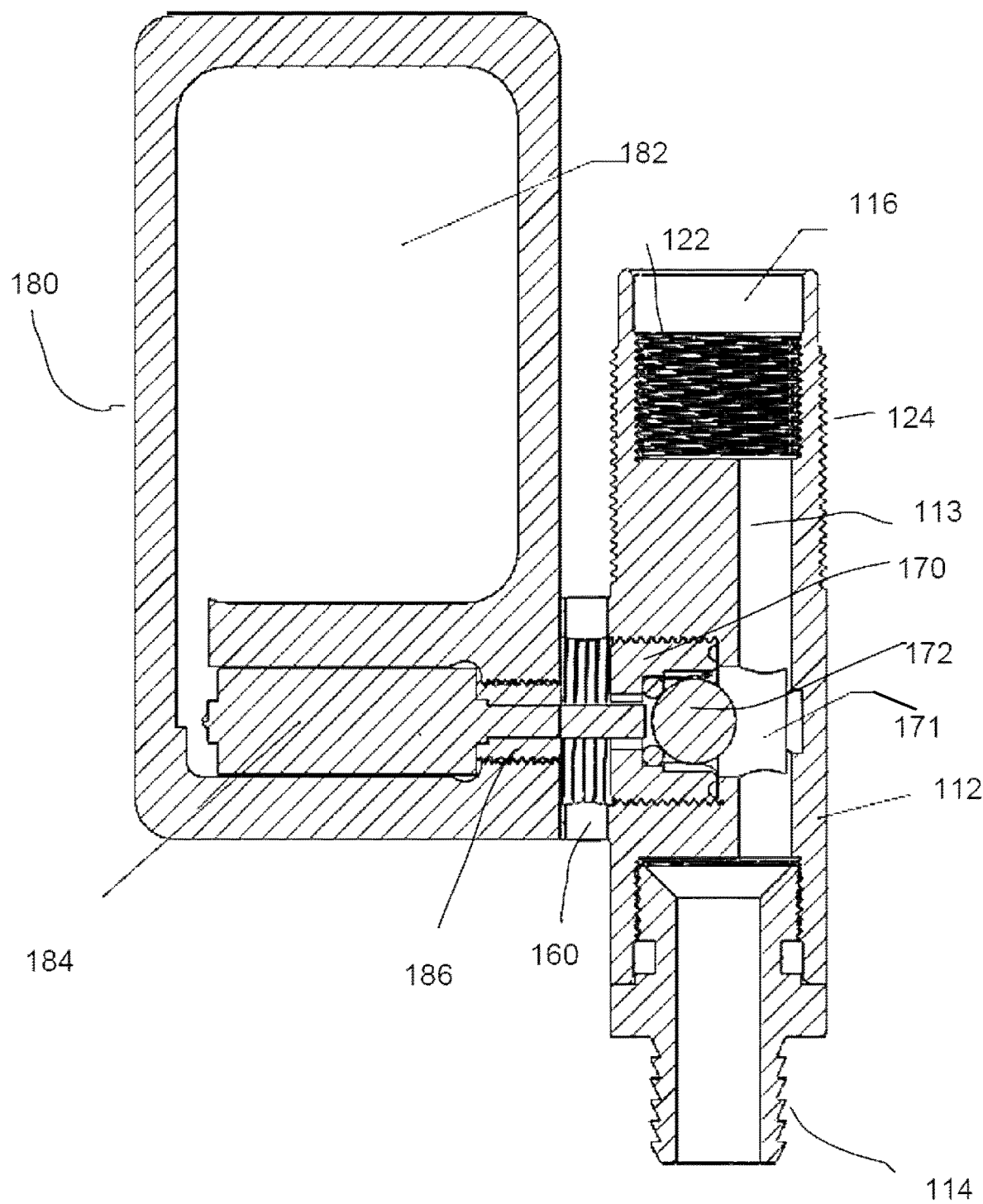
FIG. 5 is a front cross-section view of the embodiment of FIG. 4.
Figure 6:
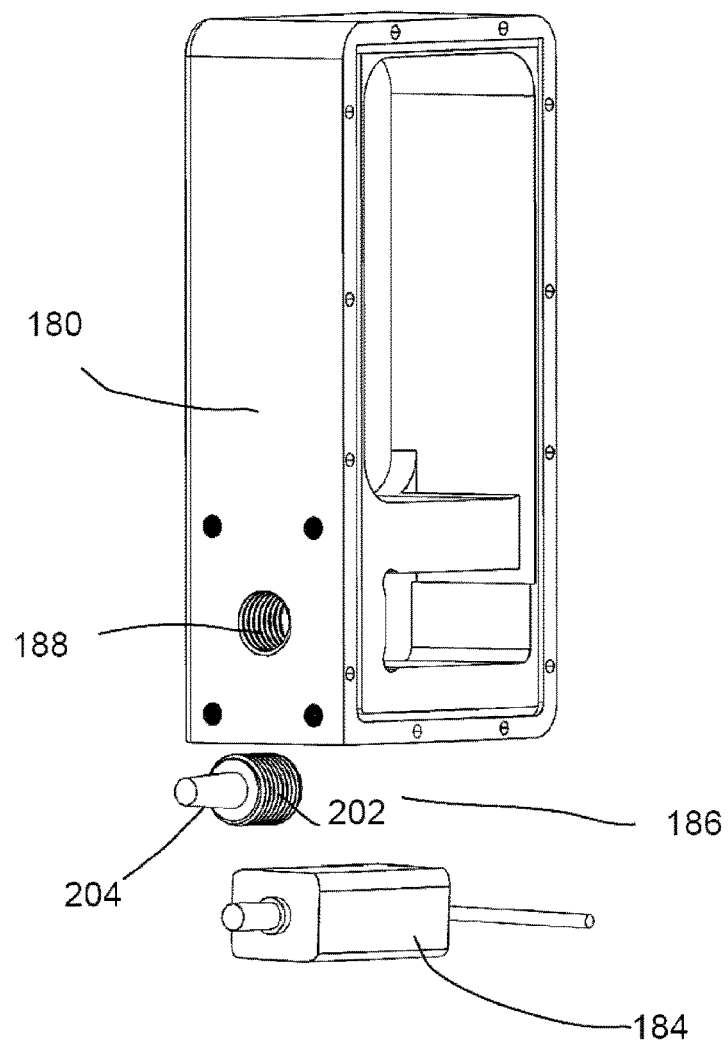
FIG. 6 shows an exploded perspective view showing the electronics housing, motor and drive pin for the embodiment of FIG. 4.
Figure 7:
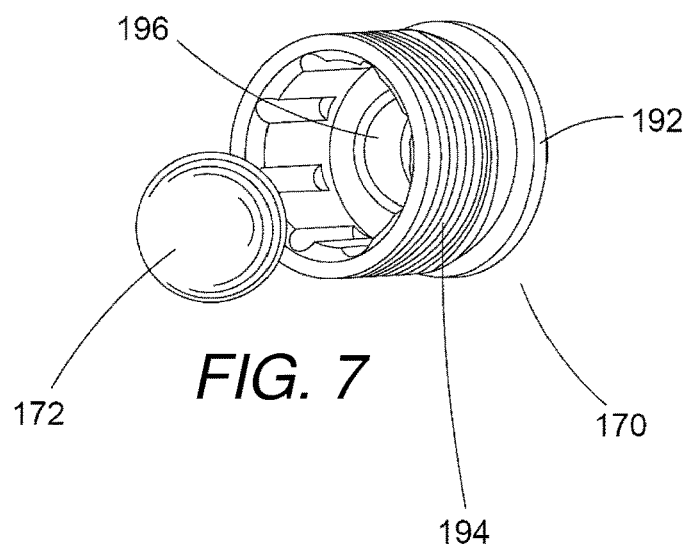
FIG. 7 shows a perspective view of the valve seat and ball valve for the embodiment of FIG. 4.

FIGS. 4 and 5 shows another embodiment of a safety valve 10c which replaces a tire valve. This embodiment also shows a generally elongate hollow main body 112 having an upper portion 116, a lower flex hose connector 114, a side tubular branch 160 having a valve seat 170 with a ball valve 172, an electronics housing 180 having a battery 182, motor 184 and a drive pin 186 for the ball valve 172

The lower flex hose connector 114 is threadably attached to the main body 112 and is adapted for connection to a flex hose or valve stem of the vehicle tire. In other embodiments, the lower flex hose connector 114 can be part of the main body 112.

The upper portion 116 of the main body 112 includes an internal thread 122 and an external thread 124. This allows a high pressure inflator hose to be attached via the external thread 124 and then for a sealing cap to be mounted via the internal thread 122. This allows rapid inflation of the vehicle tire.

Figure 8:
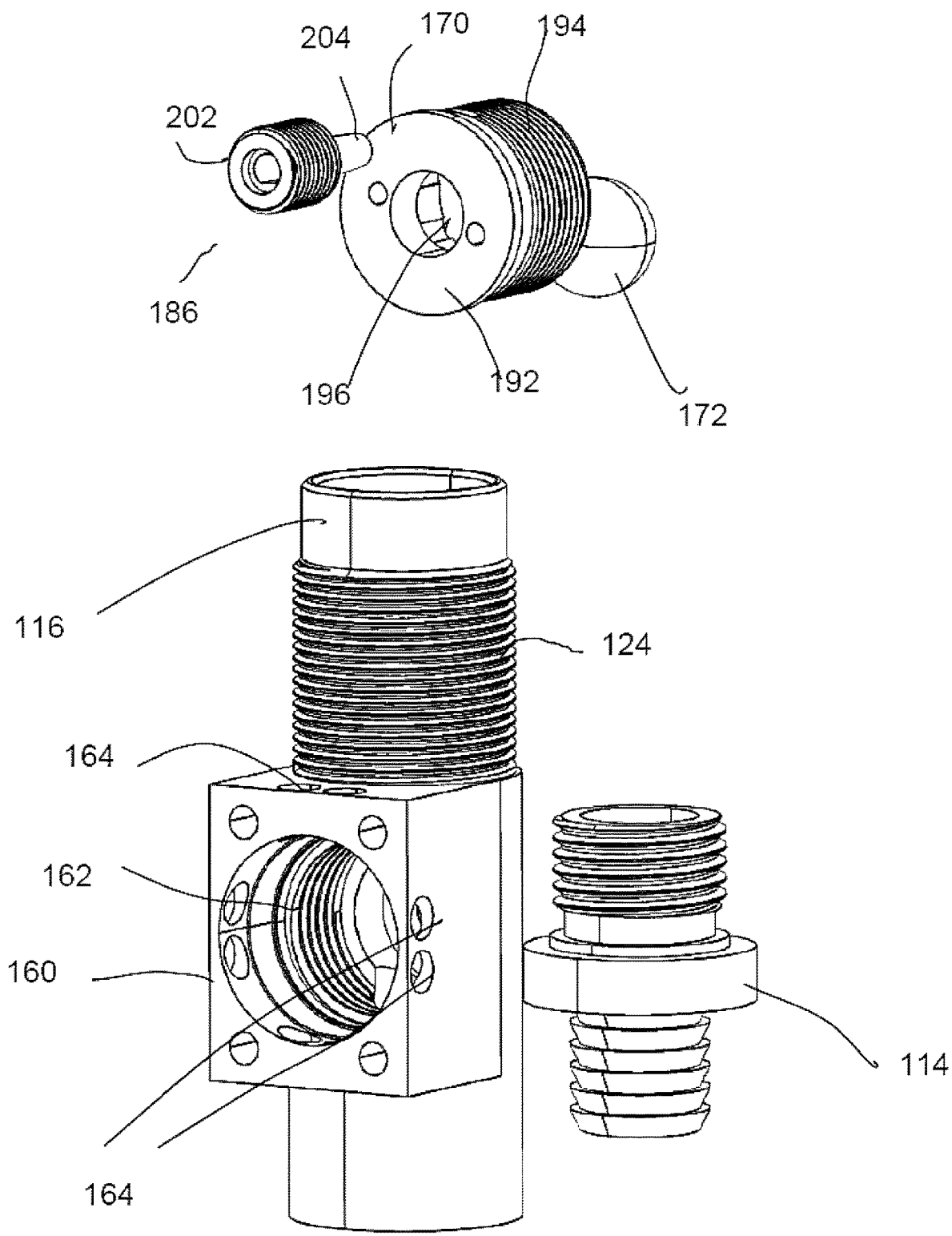
FIG. 8 is an exploded perspective view showing the main body, flex hose connector, valve seat, ball valve and drive pin for the embodiment of FIG. 4.
Figure 9:
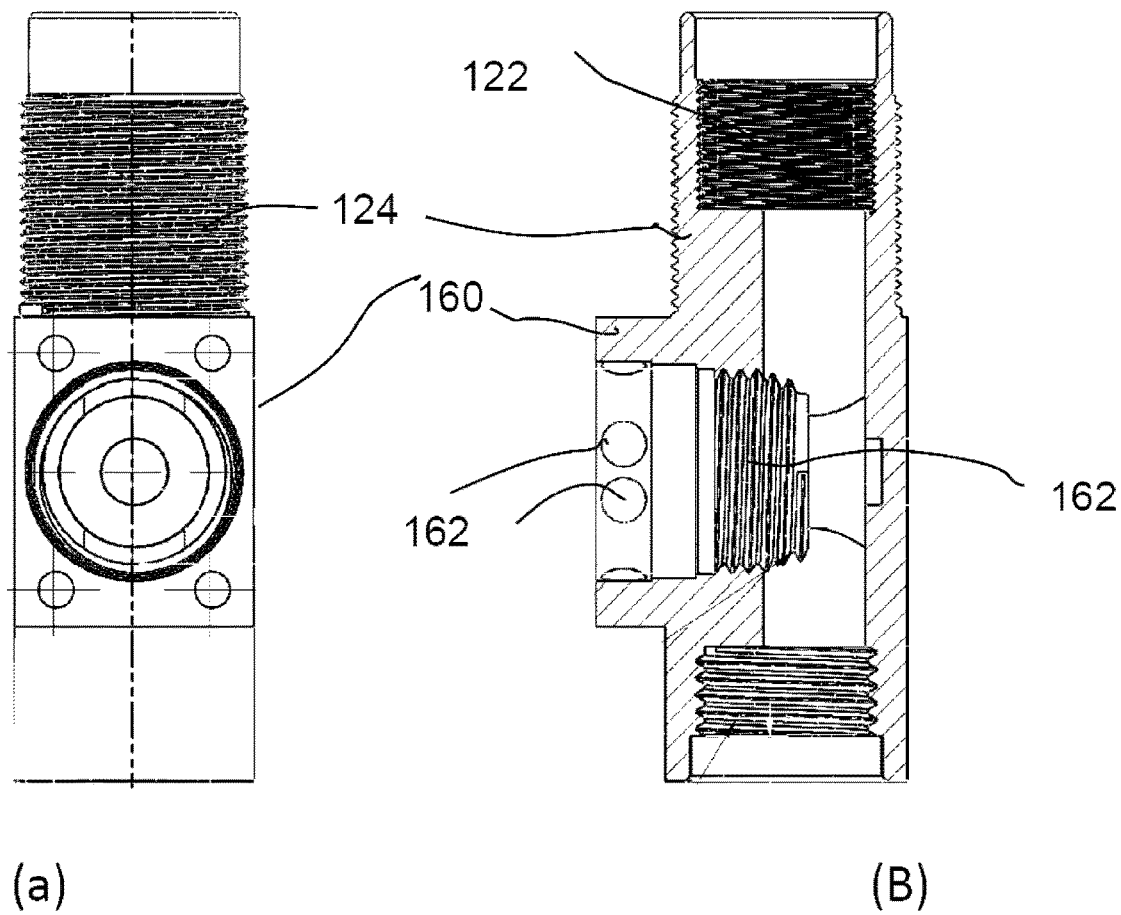
FIG. 9 shows (a) side elevation view and (b) front cross-section view of the main body for the embodiment of FIG. 4.

The side branch 160 branches from the main body 112 and communicates with the hollow interior 113 of the main body 112. The side branch 160 in this embodiment comprises a block shaped portion (see FIGS. 8 and 9) having an internal thread 162 for the valve seat 170 and a plurality of air exit apertures 164 at its periphery.

The valve seat 170 is generally cup shaped comprising a base 192 and sidewall 194 shaped to receive the ball valve 172. The side wall 194 is threaded for connection with the internal thread 162 of the side branch 160. The base 192 includes an aperture 196 therein through which the drive pin 186 can extend through to engage the ball valve 172.

The ball valve 172 sits in the base 192 within the sidewall 194. The valve seat 170 is oriented such that the base 192 faces outwardly and the sidewall 194 extends inwardly. The ball valve 172 is biased in the valve seat 170 via a spring 171 to cover the aperture 196.

In use, the drive pin 186 can extend through the base aperture 196 to engage the ball valve 172, to move the ball valve 172 away from the valve seat aperture 196, and allow air to escape via the air exit apertures 164.

The electronics housing 180 is connected to the main body 112 and houses the battery 182, wireless communication electronics, and motor 184 The housing 180 includes a threaded aperture 188 at its sidewall.

The drive pin 186 comprises a threaded base 202 and an extended pin 204. The threaded base 202 is threadably received by the housing 180 threaded aperture 188 and is coupled to the motor 184. Rotation of the motor 184 thus moves the drive pin 186 in or out of the housing 80 for engaging with or disengaging from the ball valve 172.

The ball valve 172 thus forms the blocking component which blocks an internal passage thereof and prevents air from escaping the valve 10c. The blocking component when moved by the drive pin 186 releases the air from the tire.

Each safety valve device on the individual tires will have their own identification means so that they are individually actuatable and under no circumstances can any other tire be released of it pressure other than the chosen tire. In a lightning strike incident or other urgent emergency, the user can activate all tires at once to prevent the unknown of what tire will explode.

Figure 10:
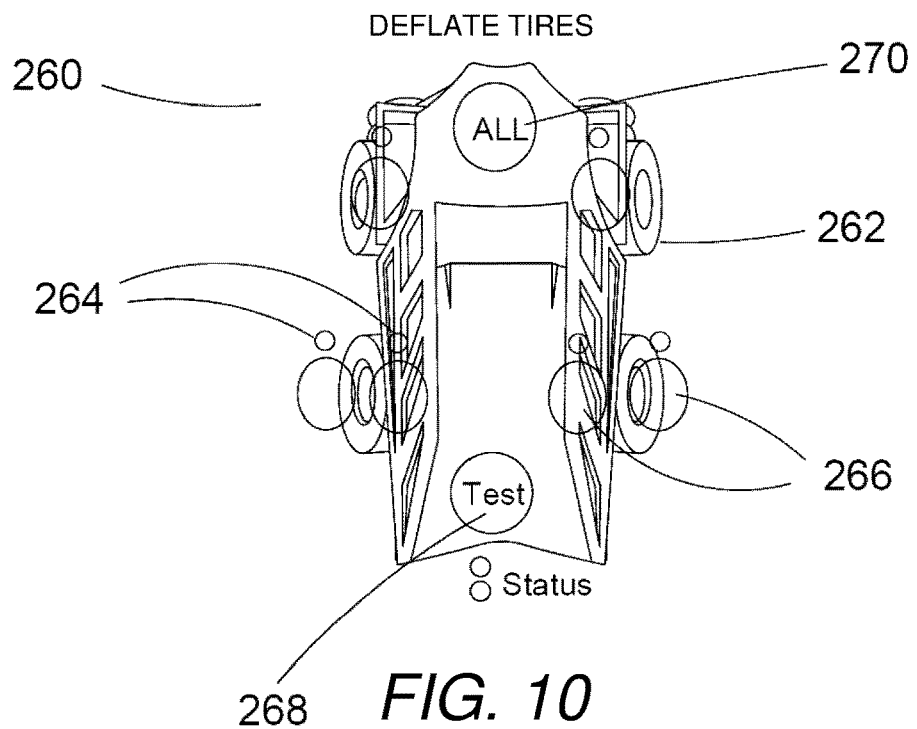
FIG. 10 shows a schematic view of a control panel icon for the vehicle with the tires individually identified.

FIG. 10 shows a control panel icon 260 for the vehicle with the tires 262 individually identified. The control panel will be mounted inside the vehicle cabin and is removable therefrom so that the control panel can be accessed from outside the vehicle if needed, to allow remote tire deflation. The icon 260 has an indicator 264 for showing the status of each respective tire, and an actuation button 266 for actuating the respective safety valve of each tire. The icon 260 also has a test button 268 for testing the inflation status of each tire, and an emergency ALL deflate button 270 which will actuate all of the safety valves of the vehicle.

The safety valve 10 provided in the embodiments is actuated electronically. The valve can also include a mechanical pressure release means for releasing air above a certain predetermined pressure.

The safety valve 10 can also include a heat sensor in the main body or the housing, at which it will automatically actuate if the heat adjacent the valve 10 exceeds a predetermined temperature.

The safety valve 10 can also include a pressure sensor in the internal cavity thereof, at which it will automatically actuate if the pressure measured by the valve 10 exceeds a predetermined pressure.

The housing can include mounting means to the rim, the mounting means being a magnet mounted to the housing.

The housing 180 with the battery and motor can be removed and the main body 112 can function as a normal valve. The safety valve 10 can inflate and deflate a tire as normal.

The safety valve 10 also includes a control box pairing button in the housing 180 for pairing with the control panel and designating the tire identification The safety valve 10 can be used for unmanned autonomous trucks and vehicles, with the control panel monitored via wireless means, GPS, Bluetooth, or any combination thereof.

The vehicles can be loaders, scrapers, graders, any large tire machines in mining in need of safety valve.

The electronic control means preferably provides a function for the safety valve 10 to be tested, by start release of air and stopping. The testing means is preferably via the remote control panel to test let down of pressure.

The air vent holes 164 can be larger or differently shaped, more holes 164 can be provided to release air faster.

The remote deflation valve is ideal for hot tire/separation safe deflate on instruction activation time in the example is 4 seconds and deflation will commence on chosen tire.

In the event of lightning or any other major hazard, deflation on all 6 tires at the same time can be performed to ensure the hazard is being eliminated from each tire. This can be achieved by the single button use on the emergency activation button (ALL tires)

Each tire has its own certified identification ID so there is no interference with other trucks or electronic communications on the mine or work site.

The vehicle cab control unit for tire activation will be portable and can be released from its holding bracket in the truck cab, to store in workshop/office where the truck/trucks are in a holding yard. This is so if lightning occurs any truck/trucks tires can be safely released from a distance to ensure neighboring businesses are not in danger of major and multiple explosions from truck tires (Storm Safety).

The release time on by activation with remote safety valve is the same as normal air release by workshop/tire fitter or can be adjusted to suit customers air release time.

The remote safety release unit can be made to suit Autonomous mining truck fleets by utilizing on-site Satellite systems/GPS modules.

A built in Temperature sensor can be optional within the deflation unit, and alarm notification will be heard/seen from the main cab control box in the machine cab/trucks and or production loader. If alarm is triggered/indicated in cab control module of high temperature, the chosen tire with this issue can be safely released before a major hazard such as fire/tire explosion occurs.

The safety release unit can also be used prior to entering the workshop for maintenance by strict instruction on which tire may be needed at a chosen time while on route to workshop, saving on down time for specific machines.

The safety release unit can be used as a normal deflate/inflate unit by removing the electronics box housing if replacement was needed without any interference of loss of air while removing electronic box.

Main cab control unit can be battery or hardwired to the machine in cab.

The focus on the remote tire deflation devices are aimed at safety being the number one priority in the mining industry to ensure all personal are not in any risk of tire hazards when a hot tire has been detected. With remote tire deflation unit there is no persons up close to release a suspected hot tire therefor eliminating possible injury or death.

It is a quick release option to deflate dangerous expanding pressures within the machine tires either hot tire deflation or workshop safety release option.

Holding yard for possible lightning strikes taking risk of businesses in a close proximity of a company holding yard.

Single release on chosen tire or if major danger occurs releasing all 6 tires at the same time to ensure dangerous pressures are reducing not increasing Although a preferred embodiment of the present invention has been described, it will be apparent to skilled persons that modifications can be made to the embodiment shown. For example, the tire valve actuator can be used to unscrew the valve core instead of depressing it. Unscrewing the valve core can release air faster.

I claim:

1. A safety valve for connection to a tire valve or valve stem of a vehicle tire, comprising:
    a hollow body having a lower end for attachment to the tire valve or valve stem,
    wherein the body is comprised of:
        a main internal passage,
        a side branch extending from the body, the side branch defining a second passage having a movable blocking component, and
        an actuation means for moving the blocking component to deflate the tire via the second passage.

2. The safety valve of claim 1, wherein the lower end is adapted for attachment to the tire.

3. The safety valve of claim 1, wherein the body further comprises an upper portion having an internal thread and an external thread.

4. The safety valve of claim 1, wherein the side branch comprises a block shaped portion with a plurality of air exit apertures at a periphery of said block shaped portion.

5. The safety valve of claim 4, wherein the blocking component comprises a ball valve mounted in a valve seat, the valve seat comprising a base having an aperture through which the actuation means can extend through to engage the ball valve.

6. The safety valve of claim 5, wherein the ball valve is biased in the valve seat via a spring to cover the aperture.

7. The safety valve of claim 5, wherein the actuation means comprises a drive pin that can extend through the base aperture to engage the ball valve, to move the ball valve away from the valve seat aperture and allow air to escape via the air exit apertures.

8. The safety valve of claim 7, wherein the drive pin is movable via an electric motor, solenoid, or linear actuator.

9. The safety valve of claim 8, further comprising an electronics housing connected to the body and housing a battery for the electronic actuator means, and wireless communication means for the actuator.

10. The safety valve of claim 9, wherein the actuator is an electric motor and is coupled to the drive pin, the housing having a threaded aperture at its sidewall,
    wherein the drive pin comprises a threaded base and an extended pin, and
    wherein the threaded base is threadably received by the housing threaded aperture such that rotation of the motor moves the drive pin in or out for engaging with or disengaging from the ball valve.

11. The safety valve of claim 9, wherein the wireless communication means is adapted for receiving an actuation signal to move the blocking component to deflate the tire via the second passage of side branch.

12. The safety valve of claim 1, wherein the second passage has a larger diameter than the main passage.

13. An assembly, comprising:
    a plurality of safety valves according to claim 11; and a control module for remotely monitoring the status of each safety valve and remotely actuating one or more of the safety valves as desired.

14. A vehicle, comprising:

the assembly of claim 13, the safety valves being mounted to each respective tire thereof.

\* \* \* \* \*